United States Patent [19]

Castiglione

[11] 4,262,790

[45] Apr. 21, 1981

[54] SYSTEM FOR SEPARATING PARAFFIN FROM OIL IN REFINERIES

[76] Inventor: Alfonso Castiglione, Via G. D'Annunzio, 7, 34015 Muggia (TS), Italy

[21] Appl. No.: 94,712

[22] Filed: Nov. 16, 1979

[30] Foreign Application Priority Data

Apr. 13, 1978 [IT] Italy .............................. 83366 A/78

[51] Int. Cl.³ ........................ C10G 73/32; C10G 73/34
[52] U.S. Cl. ..................................... 196/14.5; 62/537; 62/540; 208/37; 208/DIG. 1
[58] Field of Search ................. 196/14.5; 62/537, 540; 208/37, DIG. 1

[56] References Cited

U.S. PATENT DOCUMENTS

| | | | |
|---|---|---|---|
| 1,636,730 | 7/1927 | Amdursky | 196/14.5 |
| 2,614,056 | 10/1952 | Wanderer et al. | 208/37 |
| 3,232,069 | 2/1966 | Hawkins | 62/540 |
| 3,506,564 | 4/1970 | Cone | 196/14.5 |

Primary Examiner—Bradley Garris

[57] ABSTRACT

Apparatus for separating paraffin from oil in refineries wherein such separation is accomplished by a cooling process, in a heat exchanger, the apparatus controlling the cooling process by sensing either the pressure upstream of the heat exchanger and directly controlling the flow through a heat exchanger bypass, or sensing the temperature downstream of the heat exchanger and inversely controlling the flow through a heat exchanger bypass, the flow control in each case regulating the flow of cooling liquid through the heat exchanger.

4 Claims, 2 Drawing Figures

SYSTEM FOR SEPARATING PARAFFIN FROM OIL IN REFINERIES

BACKGROUND OF THE INVENTION

The present invention relates to the treatment of oils in refineries, and more particularly to the treatment of oils containing paraffin or so-called paraffinated oils, for separating the paraffin from the oil and vice versa. These installations may include a system that provides an initial dilution of the oil to be treated, hereinafter called charge oil, with appropiate solvents, in usual cases with "MEK" (methylethyl ketone) and toluol, respectively, in proportions, for example, of 60% and 40% respectively.

According to this usual process, the charge oil must be subjected, for the required separation of the paraffin from the oil, to cooling that is done in known type heat exchangers in which a refrigerant liquid delivers cold to the charge oil, to cool it for the purpose of the required separation.

For example, for an oil of the "LUB O" type, the temperature is typically carried down to about $-28°$ C. In these installations, as is known to the experts in this field, one refrigerant fluid is generally the recovery oil stemming from the treatment of the charge oil, that is to say the oil that has already been passed through the cooling and filtration process, and this permits the use of the cold already given off to the recovery oil by previous removal of paraffin and removal of oil.

Such refrigerators are usually called "chillers" in these installations, but in reality the refrigeration installation is more complex and includes pre-refrigerators, so-called "prechillers", that are located upstream of the refrigerators or "chillers".

The heat exchanger section mentioned above and relating to said "prechillers" (generally there are two of them: a prechiller I and a prechiller II) contains for a good operation of the installation, a series of restrictions or valves along the charge oil line and branches of same to the "prechillers", and likewise along the oil recovery line and the respective branches of same to the "prechillers" for transfer of cold to the charge oil.

Generally, for each prechiller there are three restrictions or valves on each flow, respectively one on the line toward the outlet and return of the branch and two in the "chiller" branch, respectively upstream and downstream of same.

The installation is adjustable, by means of these valves for good functioning but, as is known the process is not always constant for various reasons and also because of the diversity of the components of the charge oil, in which the content in paraffin is not always constant.

In these installations, the recovery oil temperature at the output of the prechillers is generally at $-20°$ C. and, hence, it is for this reason that it is used as an exchanger fluid for the recovery of cold.

However, because of the inconstancy of the characteristics of the charge oil and other known factors of the technology, for example variation of the ambient temperature, functional problems, etc., it is noted that the charge oil becomes either too cooled or arrives in too little quantity to the prechillers, so that the process becomes inconstant and difficult to normalize.

However, the most serious disadvantage is noted when the charge oil is cooled excessively, increasing the viscosity, obstructing the conduits and blocking the system. Then it is necessary to intervene manually with the recovery oil refrigerating valves, opening the line restrictions, adjusting the flow of the prechillers, and this manually, in order to increase the temperature of the charge oil. In cases of total obstruction, the work is much more complex, requiring increasing the percentage of solvent in the charge oil to increase its fluidity and blocking the flow of refrigerant oil and/or providing for direct washing, with solvent, of the charge oil tubing running to the prechillers, which obviously includes stopping production and consequent reduction in output of the installation.

SUMMARY OF THE INVENTION

The purpose of the present invention is to achieve a complete automation of the process, without external intervention by the operators for regulation and, additionally, to increase the output of the installation itself with consequent increase in production, since with the solution of the present invention normalization of the installation is provided for in a fashion that such obstructions are no longer permitted.

When the system of the present invention is operating at low loads, there is no obstruction (the charge oil is diluted in the ratio of about 120% with solvent), and when the load is increased, for example to make the installation operate at full speed, there may be a consequent increase in cooling from the load itself that is excessive, contrary to what could be imagined, and the reason for this being that the oil runs more rapidly through the feed line and the recovery line, hence in running through loses more cold, thereby overcooling the charge oil in the prechillers.

At maximum process rate (nowadays all installations function at the load line upstream from the first prechiller, and this is the moment to intervene manually to regulate the installation as described previously), in order to avoid obstruction (especially when the pressure goes to 10–12 kg/cm$^2$) manual intervention is all the more necessary the more the pressure is increased on the charge oil line upstream from the prechillers, or if the temperature is too low downstream from the prechillers, the reason for this being that the charge oil in the prechillers has become excessively viscous and no longer flows easily. The recovery refrigerant oil then cools down even more, ultimately obstructing still further the installation, which renders it still more viscous and, for this reason, worsens the situation.

In accordance with the invention, the solution consists essentially in applying in the recovery refrigerant oil flow, at the point of the so-called line restriction placed between the supply and return of the branch to the refrigerator of interest, an unloading control valve of the type that can be adjusted by servo control, for example a pneumatic or fluid-dynamic or electromechanical valve, etc. This valve may or may not substitute for the previously described restriction or valve, but is preferably connected as a bypass valve on the same stretch of line, for the purpose of causing to flow, respectively directly in the line in the case of substitution or through a bypass in the case of a parallel line, the flow of cooling oil to a greater or lesser degree in the line utilizing the discharge oil unloading control valve. In this manner the unloading control valve operates in the direction opposite to that of flow in the branch to the refrigerator of interest for which, when this valve opens, the recovery oil flow increases in the line and exchange flow to the prechiller is reduced, decreasing cooling of the charge oil; and, when this valve is closed, recovery oil flow in the line decreases and thereby increases the recovery oil flow to the prechiller, increasing cooling of the charge oil. The unloading control valve is thereby commanded by a reaction to the behavior of the charge oil in the installation for purposes of normalizing the process by normalizing its flow.

A principal object of the present invention is therefore to provide a control valve for controlling the flow of oil to a refrigerator, normally called a "prechiller", for the refrigeration treatment of the charge oil.

Another object of the invention is to provide an unloading control valve for sensing pressure in the charge oil line, whereby the unloading control valve is pressure controlled (PC) by means of a pressure type sensor placed in the charge oil line upstream from the refrigerator of interest in order to sense the pressure and to control its condition ahead of same, and in a pre-established regulated manner the unloading valve for control of flow of the recovery refrigerant oil to the refrigerator and/or to others in such a manner that:

(a) when the charge oil pressure upstream from the refrigerator increases above a pre-established limit, the discharge valve for the recovery refrigerant oil opens wide to decrease the flow of same to the refrigerator; and (b) when the charge oil pressure decreases to below a pre-established limit, the unloading valve for the recovery refrigerant oil closes fully to increase the flow of same to the refrigerator.

Yet another object of the invention, which may be an alternate object to the preceeding one, is to provide an unloading valve for sensing temperature in the charge oil line, whereby the unloading control valve is temperature controlled (TC) by means of a temperature sensing means in the line downstream from the refrigerators of interest to sense the charge oil temperature after this latter has passed through the refrigerators and to cause the unloading valve to function in conformance to the system functioning described above, that is to say:

(a) when the temperature increases above the pre-established limit, to increase the flow of the refrigerant to the refrigerators, fully closing the unloading valve for the recovery oil to the line; and (b) when the temperature decreases below the pre-established limit, to diminish the flow of the refrigerant to the refrigerators, fully opening the unloading valve of the recovery oil in the line.

BRIEF DESCRIPTION OF THE DRAWINGS

The preceding objects will be understood, and other and further objects will appear from the following detailed description of two preferred embodiments of the invention in the type of installation of interest for the application of the invention, and with reference to the drawings, in which.

DESCRIPTION OF THE PREFERRED EMBODIMENT

Figure 1:
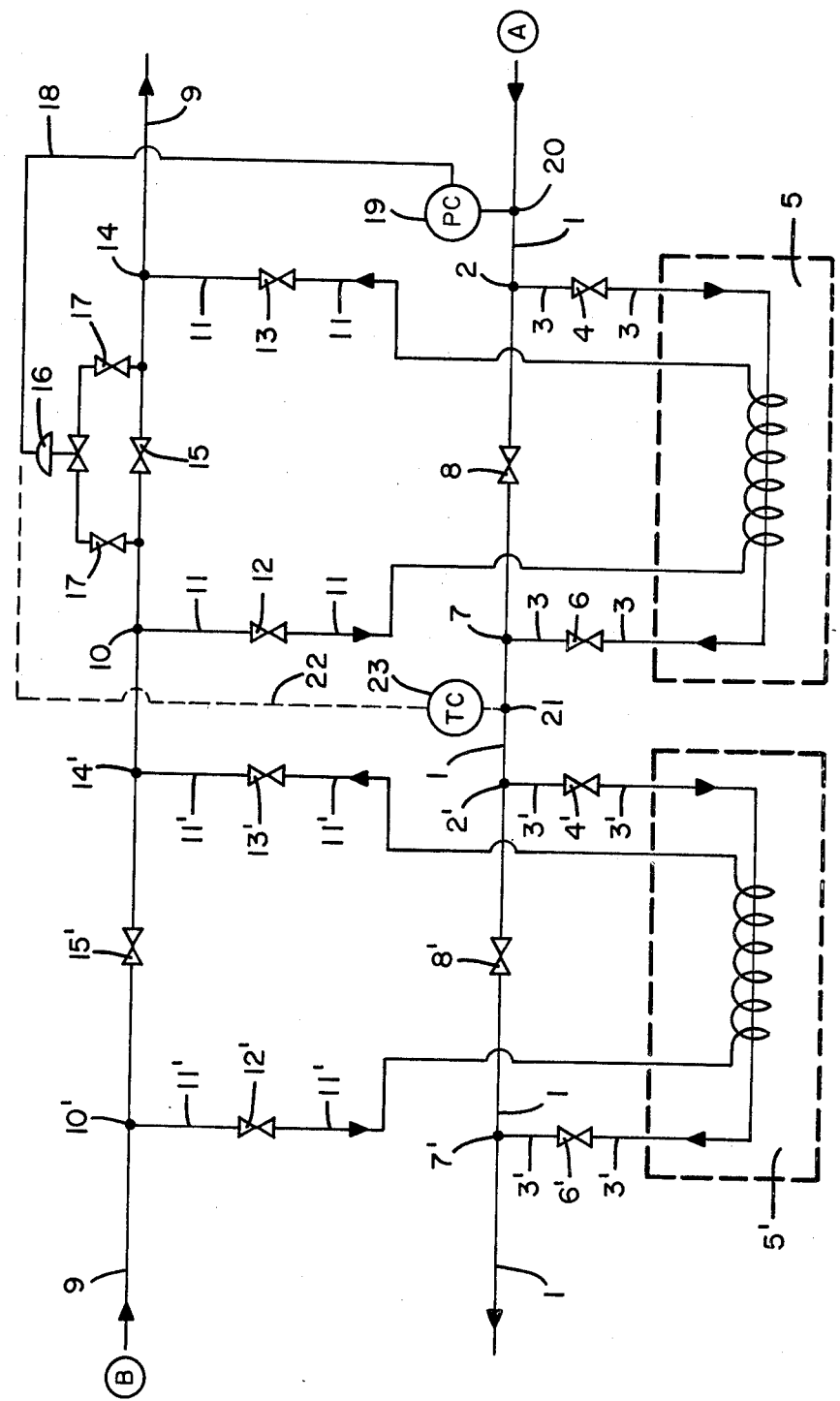
FIG. 1 is a schematic illustration of a PC and a TC installation.

Referring first to FIG. 1, there is shown a line A representative of a charge oil line and a line B representative of a refrigerant recovery oil line, with the respective arrows indicating respective flow in opposite directions. The charge oil line A is substantially defined as a continuous line 1 which comes to a branch 2 that contains in it a supply branch 3 to a restriction 4 and which is inside of a first pre-refrigerator or first "prechiller" indicated at 5; the branch line 3 for the charge oil from the main line A then leaves the first prechiller 5 and passes through a restriction 6 downstream from prechiller 5, flowing to the junction of the branch 7 on line 1 for the charge oil A. Between the two branches for feed 2 and return 7, in line 1, is provided another restriction 8. The charge oil line contains a mixture of recovery oil and paraffin, diluted with "MEK" and toluol solvent, all of which flows generally as shown through charge oil line 1.

In similar fashion, the charge oil line with paraffin, diluted with "MEK" and toluol solvent, flows along 1 to then again arrive in a second branch 2' with conduit 3' and supply restriction 4' and return 6' through to a second refrigerator and prechiller 5', to then again joint 7' to the normal conduit line 1, and where there is provided between the two supply and return branches, respectively 2' and 7', a line valve 8' similar to valve 8.

The recovery oil line, with paraffin and solvent removed, indicated as B, carries the fluid at about −20° C., and analogously to the charge oil line is shown as a straight line indicated by 9 which, in a first branch 10' and a branch network 11' with supply restriction 12', joins to the so-called second "prechiller" 5' for heat exchange by giving off cold to the branch conduit 3' of the charge oil line A, to then leave the second prechiller 5', and via a restriction downstream from the second prechiller 5' indicated with the reference number 13', joins to the direct load line over the branch indicated by the reference number 14', there being the provision that there is installed between the two branch points 10' and 14' a restriction 15' for interrupting and/or partializing the normal flow line 9.

Analogously, downstream from this branch on line 9, there is provided another branch 10 with the branch network 11 and restriction 12 for the exchange of cold inside of the first prechiller 5, to then again join, through a similar unloading control restriction 13 at 14, to the normal unloading flow line 9. Normally provided, like the preceding branch, between the two branches respectively 10 and 14 is a line restriction 15.

The description to this point is in conformance with known and presently existing installations.

The invention consists essentially in applying a servo-controlled valve 16, in this specific case in bypass through the conduit 17, respectively on line 9 between the branch points 10 and 14 of the branch line 11 that carries cold to the first prechiller 5.

This regulating valve has the function of controlling the unloading of the recovery oil on line B through opening or closing of valve 16, in this fashion permitting a greater or lesser unloading flow, through line 9 of recovery oil. It follows, given the resistance of the circuit 11 to the prechiller 5, that opening the restriction on the valve 16 there is a greater flow over line 9 and a reduction of flow over line 11, reducing cooling of the charge oil; vice versa if operated in reverse.

The unloading control valve 16 in accordance with a first preferred solution represented by a continuous line with conduit 18 is connected to a "pressure control" or so-called pressure control system, (PC) 19 which is installed on line 1 at 20 upstream from the prechiller 5. This PC control system is structured in such fashion that it can be set to a predetermined pressure and furnish a command to valve 16 in such fashion that when the pressure on line 1 at 20 increases above a predetermined value, this determines within line 18 opening of the valve 16, increasing the flow through valve 16. If the pressure on line 1 at point 20 decreases to below a predetermined value, the control system 19 and line 18 acts upon the unloading control valve 16, reclosing it fully to diminish the flow through valve 16. In this fashion it is noted that in the first case there is a reduction of flow in the branch network 11, reducing the exchange of cold and permitting reheating of the charge oil over line 3; while in the second case, there is an increase of flow through network 11, increasing the exchange of cold of the prechiller 5 and, consequently, ultimately cooling the charge oil in circuit 3.

With this system, automatic regulation and normalization of the flow of the charge oil is actuated for the required treatment of removal of paraffin.

A variant of the precedingly described solution consists in connecting the unloading control valve 16 with so-called "temperature control" system (TC), or system of control from temperature, normally applied downstream from the first prechiller on line 1 at 21 to sense the temperature of the charge oil after this latter has passed through the first prechiller 5 and it then passed through the second prechiller 5', and in which said temperature control system is connected through the dotted line 22 to valve 16 to command valve 16. The TC temperature control system, indicated generally at 23, is set to predetermined temperature limits such that when the temperature is sensed above a predetermined level on line 1 at point 21, TC 23 interacts on valve 16 closing it fully and reducing the flow through valve 16, of recovery oil B, thereby increasing refrigeration of the charge oil in line 1; and vice versa when the temperature at point 21 on line 1 decreases to below a predetermined, pre-established level, the TC control system 23 interacts through the line 22 on valve 16 to open the valve 16 and, thereby, increase the flow, through valve 16, of recovery oil B for purposes of reducing the flow in the branch network 11 to the first prechiller 5 in order to reduce the exchange of cold and to consequently increase the average temperature of the charge oil in the feed network A.

Figure 2:
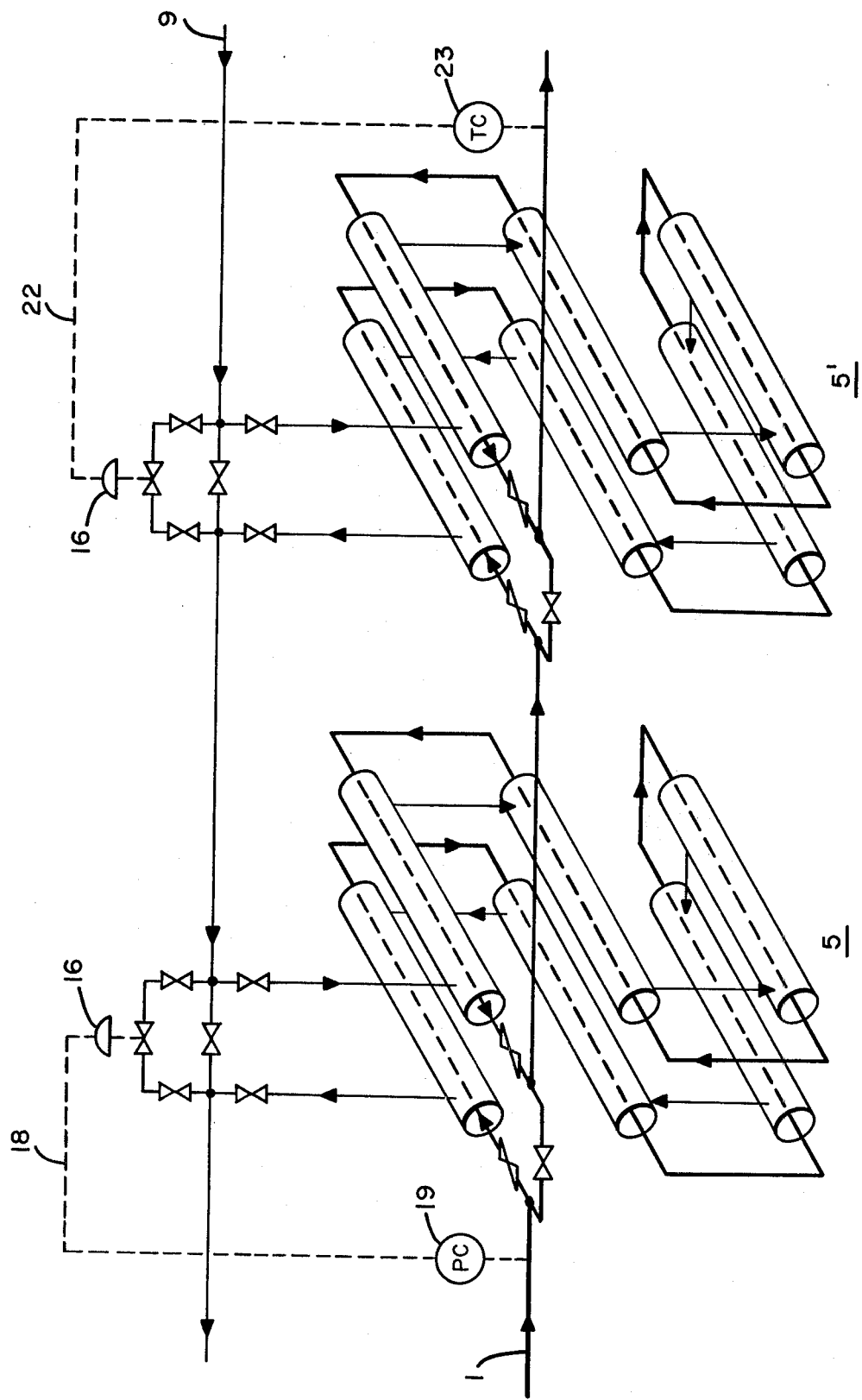
FIG. 2 is a pictorial and schematic illustration of a PC and a TC installation.

Naturally, this is by way of example as to how the system could function and also operate on the second prechiller of FIG. 2 or also on successive chillers, without, with this, changing the innovative substance of the present invention.

The particulars of execution can also vary without changing the innovative substance of the invention as is described, illustrated and essentially as claimed below.

What is claimed is:

1. Apparatus for removing paraffin from a charge oil to be treated and for automatically controlling the process of cooling in known type heat exchangers in which a refrigerant liquid delivers cold to the charge oil to cool it for the required separation, and where the refrigerant liquid is generally the recovery oil stemming from treatment of the charge oil, comprising a heat exchanger having an inlet and an outlet for the flow of charge oil therethrough, and an inlet and an outlet for the flow of cooling recovery oil therethrough; a pressure sensor connected to said charge oil inlet and having an output for providing a sensible manifestation representative of said charge oil pressure at said charge oil inlet; a control valve connected between said recovery oil inlet and outlet in bypass flow relating to said heat exchanger, said control valve having a control input responsive to said sensor sensible manifestation for regulating oil therethrough; and means for coupling said sensor sensible manifestations to said control input; whereby an increase in charge oil flow rate causes a decrease in recovery oil flow rate through said control valve, and a decrease in charge oil flow rate causes an increase in recovery oil flow rate through said control valve.

2. The apparatus of claim 1, further comprising a second bypass valve coupled in shunt flow connection to said control valve.

3. Apparatus for removing paraffin from a charge oil to be treated and for automatically controlling the process of cooling in known type heat exchangers in which a refrigerant liquid delivers cold to the charge oil to cool it for the required separation, and where the refrigerant liquid is generally the recovery oil stemming from treatment of the charge oil, comprising a heat exchanger having a charge oil inlet and a charge oil outlet for the flow of charge oil therethrough, and an inlet and an outlet for the flow of cooling recovery oil therethrough; a temperature sensor connected to said charge oil outlet, and having an output for providing a sensible manifestation represenative of said charge oil temperature at said charge oil outlet; a control valve connected between said recovery oil inlet and outlet in bypass flow relating to said heat exchanger, said control valve having a control input responsive to said sensor sensible manifestation for regulating oil flow therethrough; and means for coupling said sensor sensible manifestations to said control input; whereby an increase in charge oil flow rate causes a decrease in recovery oil flow rate through said control valve and a decrease in charge oil flow rate causes an increase in recovery oil flow rate through said control valve.

4. The apparatus of claim 3, further comprising a second bypass valve coupled in shunt flow connection to said control valve.

* * * * *